May 9, 1933.  R. CHILTON  1,907,504
VARIABLE PITCH PROPELLER
Filed March 1, 1929  2 Sheets-Sheet 1

May 9, 1933.   R. CHILTON   1,907,504
VARIABLE PITCH PROPELLER
Filed March 1, 1929   2 Sheets-Sheet 2

INVENTOR
Roland Chilton
BY
ATTORNEY

Patented May 9, 1933

1,907,504

UNITED STATES PATENT OFFICE

ROLAND CHILTON, OF KEYPORT, NEW JERSEY, ASSIGNOR, BY MESNE ASSIGNMENTS, TO UPPERCU CORPORATION, A CORPORATION OF DELAWARE

VARIABLE PITCH PROPELLER

Application filed March 1, 1929. Serial No. 343,670.

This invention relates to variable pitch propellers wherein a pitch increasing blade turning movement is derived from the centrifugal force of the blade, the movement being opposed by a preset control spring means. The present embodiment constitutes an improvement over that of my co-pending application, Serial No, 340,214, filed February 15, 1929.

One object of the present invention is to afford a wider range in the pitch, speed, and torque relationship than is afforded by the mechanism shown in the co-pending application.

As in the aforesaid application, the propeller of this invention consists essentially of blades mounted for pitch changing rotation in a hub, and having the blades secured against centrifugal force by means adapted to generate therefrom the desired pitch increasing movement in opposition to a co-operating spring. The connections include thrust plates secured to the hub and blades respectively, and themselves connected by means inclined to produce the desired turning movement. In the former case these means compromise balls co-operating with inclined portions of the thrust plates and the inclines are there shown as of constant slope, giving a constant ratio between the centrifugal force and the pitch increasing force derived therefrom, to which in turn the required spring pressure is directly proportional. Substantial movement of the spring occurs during full pitch change and, with the lowest rate of spring practicable, this involves substantial increase in the spring pressures between the high and low pitch conditions. A stiffer spring would give still greater pressure differences but is otherwise desirable as being both shorter and lighter for a given maximum pressure.

The type of characteristics obtainable with a reasonable spring weight with the constant ratio mechanism such as shown in the co-pending application are illustrated in the diagram of Fig. 3.

The increase from initial to final pressure corresponds in this instance to the increase in centrifugal force from 1600 to 2000 R.P.M. The dotted line represents the effect of frictional resistance in the mechanism which adds to the effect of the spring when the speed and pitch are increasing, and detracts from the effective pressure when the speed and pitch are decreasing; exhibiting the well known "hysterisis loop" characteristic of spring operated mechanisms. This lowering of the speed zone of pitch change when "throttling down" as compared to that under "increasing throttle" may be of decided advantage in operation and substantial friction dampening for this purpose may be desirable in certain cases as described hereinafter.

Fig. 4 shows an alternative diagram of characteristics which may be preferable in certain aircraft applications and which are obtainable with the varying ratio blade rotating mechanism of the present invention.

One of the objects of such relationships as illustrated, is to permit of any desired adjustment of the pitch when "throttled-down" for cruising without departing from the desired economical engine speed as dictated by considerations of maximum power plant life.

It will be seen that the engine output at any given speed is proportional to the propeller pitch so that the apparently sudden change from maximum to minimum pitch may be accomplished by a relatively wide change in throttle setting and power output in spite of the slight change in engine speed and therefore in the actuating centrifugal force.

Such characteristics require a correspondingly slight change in the effective spring reaction against the centrifugal force and this (an important object of the present invention) is secured by thrust means wherein the mechanical advantage of the mechanism upon the spring increases rapidly as the pitch increases.

When inclined thrust faces co-operating with the balls are used such action would involve an acutely convex slope for each ball incline which would be difficult to fabricate and which would have undesirable contact characteristics.

It should be kept in mind that the full throttle speed of an aircraft power plant (with a constant pitch propeller) varies with the forward speed of the aircraft but that the amount of slip of the propeller increases with decreasing forward speed, reaching 100% (corresponding to zero propeller efficiency) when the aircraft is stationary, i. e., "on the ground". Loss of effective thrust during the slow speeds of "take-off" when maximum thrust is desirable (and is available with constant propeller efficiency) therefore occurs with propellers having high pitch suited for high efficiency at normal flying speed.

Referring now again to Fig. 4, it will be seen that the desired low pitch condition may be maintained throughout the "take-off" period, (of reduced engine R. P. M. with wide open throttle), changing to maximum pitch when free flight speed has been attained and that this high pitch may be thereafter maintained although the engine be throttled back to the desired reduced power and R. P. M. for cruising economy, and that the actual pitch in use maybe determined by appropriate throttle adjustment without departing from the desired cruising R. P. M. These are objects of the variable pitch propeller of the present invention which may alternatively be regarded as a governor, automatically increasing the load on the power plant as the throttle is opened without departing from the desired economical cruising engine speed.

By proportioning the rate of increase in the turning moment from the thrust responsive means to be greater than the rate of increase in spring pressure the device of this invention may be made to give full pitch change without any increase in engine speed, but of course a substantial increase in throttle opening would be required to generate the necessary increased power to maintain the speed.

As a further illustration of the utility of this invention the "full power dive" manœuvre demanded of modern military aircraft may be cited. This involves extremely high plane speeds and, with fixed pitch propellers, endangers damage due to overspeeding the power plant. This overspeed may be avoided by the use of a propeller, according to the provisions of this invention, which may be so preset that the pitch will automatically increase to compensate for the greatly increased speed of dive without substantially increasing the power plant R. P. M.

In the drawings:

Figure 5 is a sectional detail view on an enlarged scale of the notched connection shown in Fig. 1.

Figure 1:
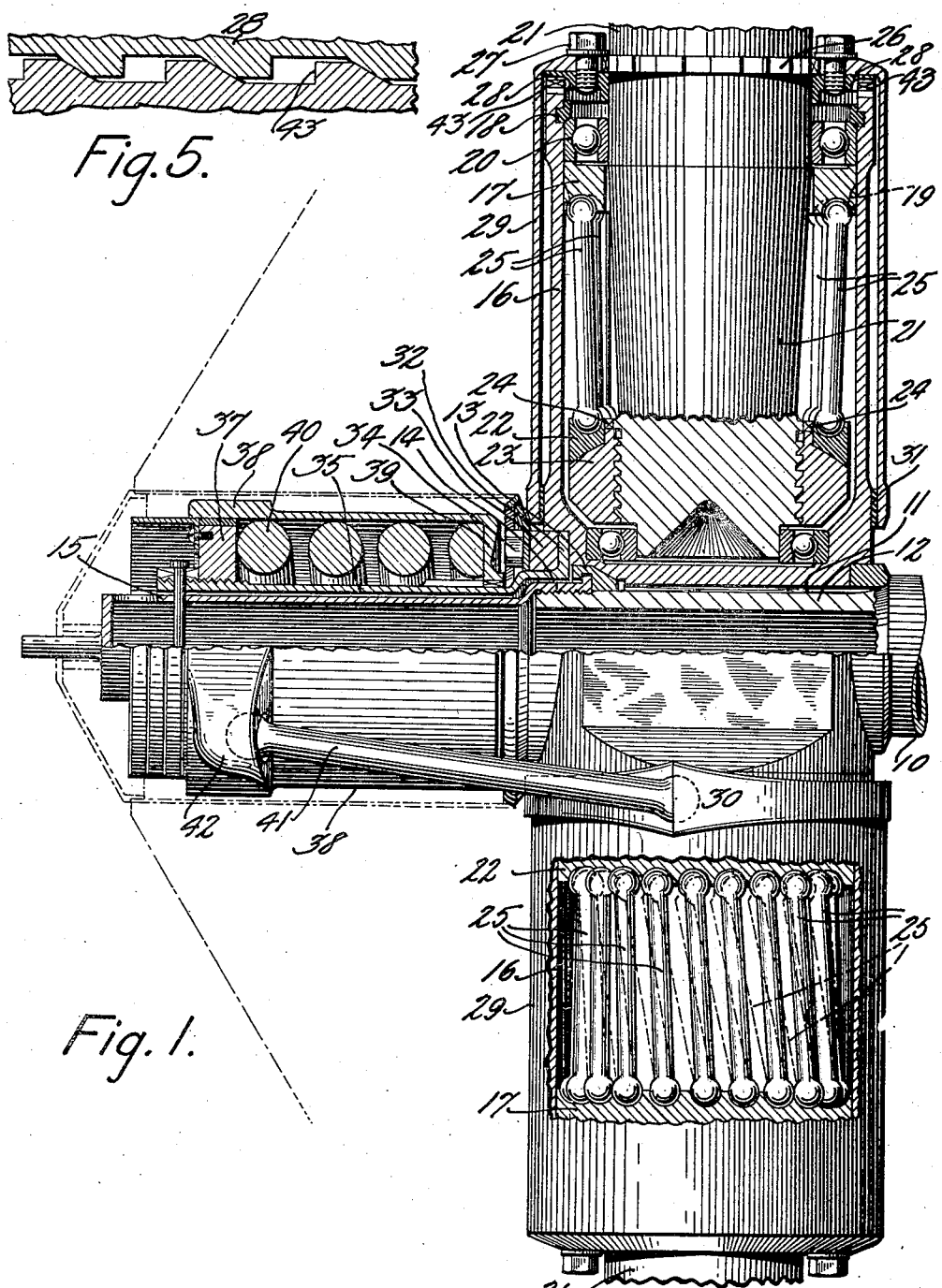
Figure 1 is a side elevation of the present invention shown partly in section.

Referring particularly to Fig. 1, 10 designates the conventional propeller shaft-end of the power plant which is splined at 11 to drivably mount the hub 12 by means of the conventional coned lock ring 13 and the nut 14, which in this case has a long extension 15 for convenience in tightening up. The hub comprises two integral cylindrical extensions 16 towards the outer ends of which are rigidly secured the thrust rings 17 as by the lock rings 18 and splines 19, antifriction bearings 20 being interposed between the lock rings 18 and the thrust rings 17.

The propeller blades 21 have rigid with them second thrust rings 22 secured by the nuts 23 and the notches 24 which are engaged corresponding notches in the thrust rings. Between the thrust rings 17 and 22 are a plurality of inclined ball ended compression struts 25 having a circumferentially skewed disposition and articulately engaging at their ends hemispherical depressions in the respective thrust rings. Also rigid with the propeller blade 21, as by means of interlocking elements 26 and the clamp connection afforded by the screws 27 and plates 28, are the tubular members 29 provided at their inner ends with lever extensions 30 and bearing on the outside of the cylindrical extensions 16 by means of the bushings 31.

Secured to the hub 12, as by the flange 32, packing ring 33 and bolts 34, is the extended sleeve 35 having at its outer end the spring adjusting nut 37. Arranged to slide on the sleeve 35 and upon this nut 37 is the outer spring sleeve 38 having an inturned end 39 between which end and the nut 37, the spring 40 is compressed. Ball ended struts 41 connect the lever extensions 30 of the tubular members 29 to projections 42 integral with the spring sleeve 38 so that rotation of the members 29 with the propeller blade involves an axial travel of the spring sleeve 38.

The parts are shown in the low pitch position whereat further rotation of the blades is prevented by contact between projecting elements 43 at the ends of cylindrical extensions 16 and corresponding elements cut on the underside of plates 28, which act as stops subject to the pressure of the spring 40 whereby the connections including the struts 41 are kept under continuous one-way loading even though the propeller be at rest. To include the struts 25 in this action it is desirable that the elements 43 have inclined contact faces (as shown in Fig. 5) which are adapted to generate an outward thrust on the propeller blades and thus take up any initial looseness in the parts.

The operation of the device is as follows: In the low pitch position shown, the struts 25 have a minimum, but positive, inclination and as these struts are subject to the entire centrifugal thrust of the blades, they will due to this inclination, generate a turning tendency on the blades and hence on the members 29 and levers 30. This is transmitted by the struts 41 to the sleeves 35 and the spring 40, and, when the speed of rotation generates a sufficient thrust, the spring will be overcome, the sleeve 38 will move to the right and the blades will rotate towards an increased pitch. During this action it will be seen that the inclination of the struts 25 increases, increasing the mechanical advantage of the centrifugal force reaction upon the spring and permitting a relatively large increase in pitch in spite of a substantial accompanying increase in spring pressure without necessarily increasing the centrifugal force or rotational speed. The ratios of these quantities can be adjusted by suitably proportioning the initial to the final inclination of the struts, and accordingly a relatively stiff and small spring will be adequate to give the desired characteristics as previously described.

Figure 2:
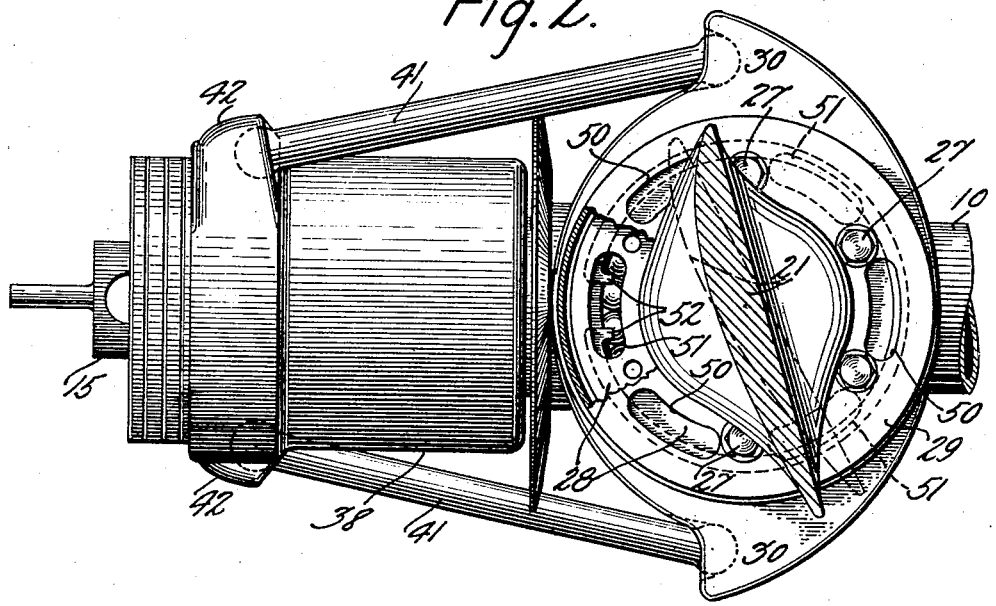
Figure 2 is a side elevation disposed at 90 degrees to that of Fig. 1.
Figure 3:
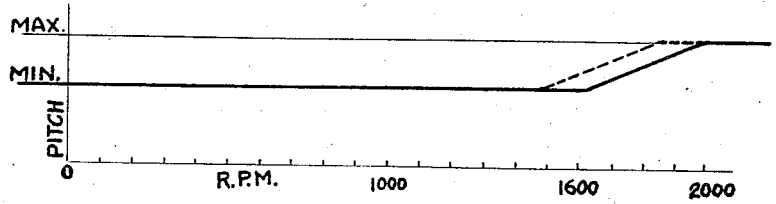
Figure 3 is a diagram of characteristics obtainable with a reasonable spring weight with a constant ratio mechanism.
Figure 4:
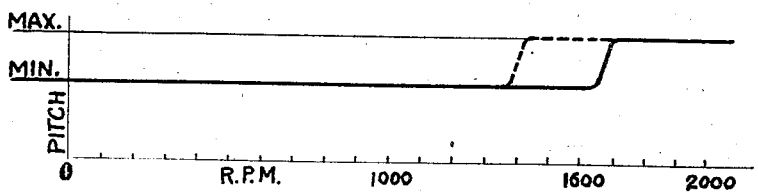
Figure 4 is an alternative diagram to that of Fig. 3.

For the method of assembly of the blades into the sleeves reference is had to Fig. 2, wherein it will be seen that the outer ends of the members 29 are provided with openings 50, normally spaced intermediate of corresponding openings 51 in the plate 28. On removal of the bolts 27 the parts may be rotated to bring these openings into register whereby the inturned ends 52 of the lock ring 18 are accessible and the ring may be contracted by a suitable tool and withdrawn from its groove in the cylindrical extension 16, all the parts associated with a blade 21 being thus withdrawable as an assembled unit. These parts include the tubular member 29, the plate 28, bearing 20, thrust ring 17 and 22, the struts 25, and the nut 23, all of which may accordingly be assembled and adjusted before the introduction of the blade mechanism, as a whole, into the hub 12 where it is secured by the lock ring 18 as described, whereafter the entire mechanism is sealed against leakage of lubricant by tightening up the bolts 27 with the openings in the end of the member 29 and in the plate 28 covered by the intermediate areas of these members.

It will be noted that in operation there will be a high centrifugal tendency on the lubricant contained in the blade operating mechanism and that the inwardly projecting member 29 will thus maintain the struts 25 in an initially established submerged condition.

Having thus described my invention, I claim:

1. In a propeller mounting, the combination of a hub having blade mountings, a propeller blade rotationally supported in each mounting, a plurality of elongated elements circumferentially disposed around the blade one end of each of said elements being articulated to the blade and the other end to said mounting and responsive to end pressure so as to cause a limited rotation of said blade.

2. In apparatus of the class described, the combination with a mounting member and a member mounted therein for oscillation about an axis of thrust, of a plurality of struts in inclined circumferential disposition about said axis and articulated at respective ends to said members, said struts being responsive to thrust to effect a uni-directional movement of said oscillation, and a yieldable means adapted to effect a return movement when the thrust is relaxed.

3. In apparatus of the class described, the combination with a pair of members adapted for relative axial and rotary movement, of connecting means therebetween adapted to define said movements said connecting means comprising struts articulated to the respective members and spaced around the axis in inclined relation thereto, and a spring means adapted to oppose said movement.

4. In a propeller adapted for pitch changing movement, the combination with a first member and a second member the first member adapted for axial and rotary movement relative to the second member, of a plurality of circumferentially disposed elements each having an articulate connection with each of said members, said elements being responsive to axial movement of the first member to change their slope during said movements in a manner as to vary the pitch of the propeller, and a yielding means tending to oppose said change in pitch.

5. In apparatus of the class described, the combination of a hub having a plurality of blade supporting extensions, a propeller blade freely journalled in each extension for rotation relatively thereto, a spring means opposing said rotation, and a plurality of struts each articulated to the propeller blade and to said extension; said struts being so disposed as to be responsive to an axial thrust of the blade to themselves impress directly thereon a tangential pitch changing force sufficient to overcome said spring means at a predetermined speed of the hub.

6. In apparatus of the class described, the combination of a hub having a plurality of blade mountings, a propeller blade mounted in each mounting for pitch changing rotation relatively thereto, a preset spring means opposing said rotation, and a plurality of struts articulated at respective ends to the propeller and to said mountings respectively; said struts having a circumferentially skewed disposition such that an axial thrust of the blade upon said struts will impress a rotational tendency upon the blade in opposition to the action of said spring means.

7. In a propeller mounting, the combination of a hub having blade mountings, a propeller blade in each mounting adapted for pitch changing rotation relatively thereto, a spring means opposing said rotation, and a plurality of elongated compression elements each having an end articulated to the propeller blade and to said mounting respectively and so disposed that an axial thrust of the blade will cause a circumferential displacement of one end of said elements relative to the other in such a manner as to overcome said spring means and to initiate a limited rotation of the blade at a predetermined speed of the hub.

8. In a propeller mounting, the combination of a hub having radially extended mountings rigid therewith, tubular members concentric therewith and supported for relative rotation thereon, a propeller blade mounted with each tubular member for movement therewith, a spring means tending to maintain the blades at a low pitch position, and thrust transmitting means comprising elements disposed angularly to and circumferentially of said blades and responsive to a predetermined rotational speed of the hub to overcome the spring means and to urge the blades towards a high pitch position.

9. In a propellor mounting, the combination of a hub, a radially disposed blade mounting means rigid therewith, a blade rotatably supported in said mounting means, a plurality of circumferentially skewed strut means responsive to the centrifugal action of the blade to actuate the same towards a high pitch position, and a preset control means rotating unitarily with said hub and adapted to maintain the blade in a low pitch position until a predetermined rotational speed of the hub is exceeded.

10. In apparatus of the class described, the combination of a first member subject to axial thrust, a second member, means for deriving a rotation of the first member relative to the second member from said thrust; said means comprising a plurality of thrust struts in helical disposition between said members and articulated at their ends to said members.

11. In apparatus of the class described, the combination with a driving member and a driven member organized for relative axial and rotational movement, of a connection therebetween adapted to define said movements and comprising a plurality of struts in circumferentially skewed disposition and articulated at their ends to the respective members, and a spring means tending to resist said rotational movement.

12. In a propeller, in combination, a hub having propeller blade bearings, a blade mounted for slight axial and rotary movement therein, and means for relating said movements comprising helically inclined thrust struts articulated at respective ends to the hub and blade and adapted for circumferential change in inclination during said movements, and means adapted to yieldingly oppose said movement.

13. In a pitch changing propeller mounting, the combination with propeller blades rotatable about their axes in the mounting and adapted to maintain a low pitch position at low rotational speed, of a means responsive to the axial thrust of said blades to cause a pitch changing movement of the blades to a high pitch position; said means comprising a plurality of circumferentially inclined struts articulated respectively at opposed ends to said blades and to said mounting.

14. In a propeller mounting, the combination of a hub having radially extended mountings rigid therewith, tubular members concentric therewith and supported for relative rotation thereon, a propeller blade mounted in said extension in fixed relation with said tubular members, spring pressure means tending to maintain the blades in one pitch position and actuating means comprising a plurality of strut elements circumferentially skewed so as to be responsive to the centrifugal thrust of the blades to cause a pitch changing movement thereof in opposition to said spring pressure.

Signed at Keyport, in the county of Monmouth, and State of New Jersey this 26th day of February, 1929.

ROLAND CHILTON.